Oct. 12, 1943.  C. L. GRIFFITH ET AL  2,331,467
CANNING MEAT AND MEAT PRODUCTS
Filed July 18, 1941
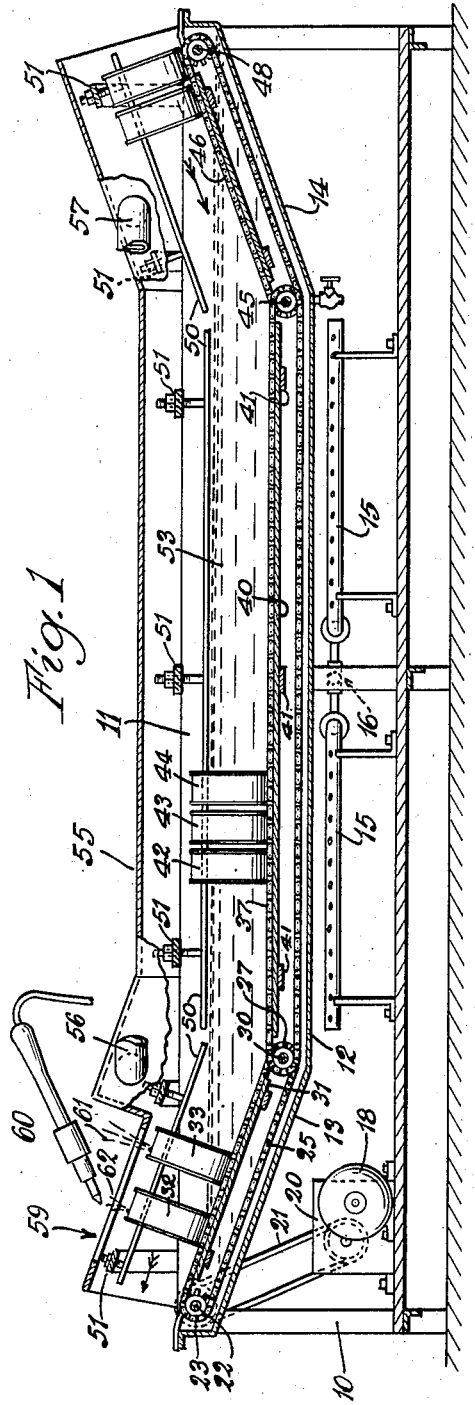
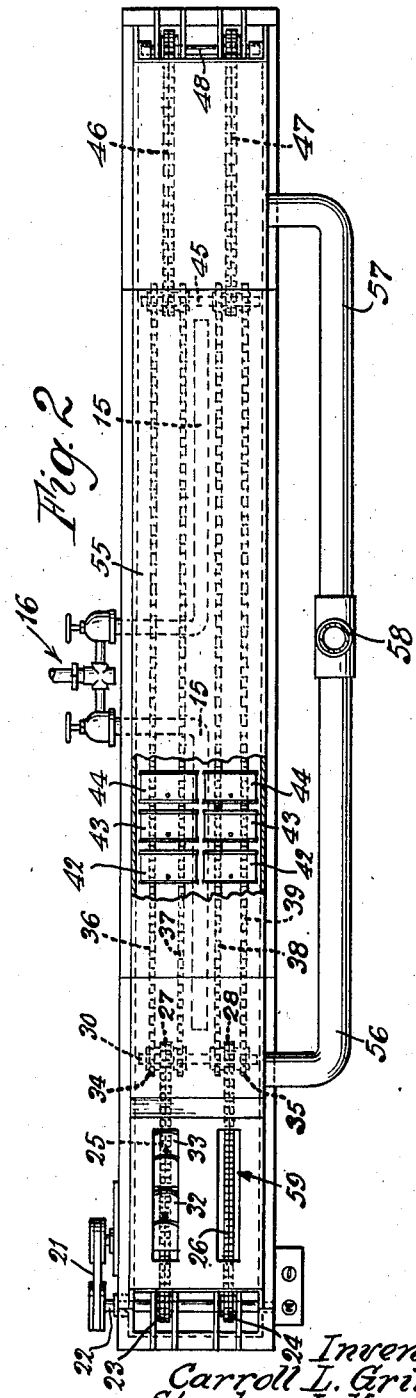
Inventors
Carroll L. Griffith
Stephen L. Komarik
by W. Bartlett Jones,
Attorney.

Patented Oct. 12, 1943

2,331,467

UNITED STATES PATENT OFFICE 2,331,467

CANNING MEAT AND MEAT PRODUCTS

Carroll L. Griffith and Stephan L. Komarik, Chicago, Ill., assignors to The Griffith Laboratories, Inc., Chicago, Ill., a corporation of Illinois Application July 18, 1941, Serial No. 402,946

15 Claims. (Cl. 99—187)

The present invention relates generally to the canning of meat and meat products, and more particularly to the canning of raw to incompletely cooked to cooked meat to be treated in the can.

Heretofore, the canning of meat and meat products has been accomplished as a general practice by closing the can containing its meat contents, leaving a small vent hole in the can through which to exhaust the air in the can, then applying a vacuum, and sealing the vent hole. The exhausting of air is accomplished by suitable means effecting a vacuum, and then the hole is soldered to close it while the vacuum exists in the can.

Then the vacuum canned meat is cooked in the sealed can to effect a desired cooked condition by any suitable procedure. One suitable procedure is described in Komarik U. S. No. 2,224,399. Said patent sets forth a problem of purging in connection with the cooking in cans, and the process is directed to minimizing the purging. Purging in this connection signifies the bleeding of fats and juices of the meat from the contents, and the shrinkage of the meat, whereby a layer of gelatinous fatty material accumulates between the shrunken contents and the walls of the can.

The present invention in one aspect is likewise directed to the same problem, but it differs in that the remedial step is applied prior to the soldering of the vent hole, and in the method of effecting exhaustion of the air. The present invention involves the subjection of the closed can having its vent hole ready for soldering, to hot gases, liquids or bodies, at a temperature which may be capable of searing the surface of the meat against the interior of the can, and which must be capable of generating steam in the can. The steam blows out the air and discharges itself with considerable pressure through the vent hole. As the can is cooled from such treatment, the steam jet subsides and may attain a condition where vacuum exists in the can at the vent hole. According to the present invention, at a time preferably while steam is still emerging from the vent hole, or otherwise before any substantial degree of vacuum exists in the can at the vent hole, the vent hole is soldered at atmospheric pressure, leaving the can without air therein, and preferably with steam therein. The sealed can may be cooled to create vacuum by condensation of the contained steam, or it may be processed by a suitable cooking procedure, after which the cooling of the can effects the ultimate vacuum normal to such cold canned products.

By this process, the generation of steam drives the steam throughout the contents where air may be pocketed, thus to drive out the air and replace it with steam. This steam is at a sterilizing temperature and it effectively sterilizes the surfaces of the can, of the meat and of the pockets and crevices where the steam may enter. All these surfaces are ones which are subjected to handling in preparing the meat and in placing it in the can, and hence these are the surfaces most likely to be infected with harmful organisms which may lead to damage in storage of the finished product. In addition the steam is derived from moisture of the contents, and in blowing from the vent hole the steam carries out free moisture as a mist, the mist and the steam effecting a drying action on the contents.

Also, the steam jet sterilizes the vent hole, and the soldering of the hole while steam emerges assures no contamination during this operation.

The process has at least three major aspects. One aim is to generate steam in the can to blow out the air and moisture. Another aim is to use a contact heat to sear the surface of the meat, whereby to close the pores, or to "case-harden" the contents, to form a sealing envelope which increases the resistance of the surface of the contents to purging by the passage of fats and juices through the meat, or the folds or openings therein. Another aim is to effect a sterilization of surfaces inside the can, and of the vent hole.

The process preferably accomplishes such objectives together, but it is to be understood that these may be conducted separately. For example, a non-searing hot bath may be applied to the can merely to generate steam to blow out the air. Then the vent hole is sealed. Then the sealed can under proper conditions may be subjected to a sear-producing heat to condition the surface to resist purging. Also, it is to be understood that a canned meat sealed by the usual application of vacuum may likewise be subjected to a sear-producing heat. Also, a can soldered closed while steam pressure exists at the vent hole, may be cooked by a process such as the Komarik process No. 2,224,399, or otherwise, without subjecting it to the sear-producing bath.

However, since both searing, sterilization, drying and air-removal are more effectively accomplished simultaneously, the invention is herein explained in its preferred embodiment to that end.

The invention also has particular application to canned hams. Hams are customarily treated to remove the bone, whereby the whole meat is flexible to withstand a compacting pressure to pack it neatly into a can with a minimum of void spaces. Such cans are oval shaped when placed flatwise horizontally, and have vertical side walls of a selected height varying with the size of the ham. In the boning operation, and in the canning, many folds of the meat result at the large end of the can, wherein air is entrapped. In the present invention the preferred practice is to have the vent hole at the small end of the can, to dip the can vertically into a hot bath, large end first, to remove the can vertically from the bath, and to solder the vent hole when the steam is about to subside. Thus, the bottom of the can, having more air entrapped than the top of the can, is first, last and longer subjected to the heat to assure the removal of such air. Where the searing heat is employed, the numerous folds at the bottom are sealed together to enhance the envelope character of the seared surface.

The same advantages apply to other whole meats, such as corned beef.

The invention is applicable to compounded meats and loaves, such as spiced luncheon meats. These are made from smaller sizes of meat or from ground meats pressed together, and have a greater tendency to purge because of the many smaller pieces in the mass. The searing quickly integrates the surface layers into a sheath or envelope to resist the purging which results when the interior portions of the meat attain a cooking temperature.

In carrying out the invention it is to be understood that the heat to which the canned meat is initially subjected for the purpose of blowing out the air and moisture, or for searing, or for both, is a much higher heat than is a "cooking" heat. It is common practice to avoid high heats in cooking to limit shrinking and purging. The present invention employs the initial high heat only for a short time to effect the main objectives with the avoidance of cooking the major contents of the can.

As stated above, a vacuum sealed can may be treated to a heat of a searing temperature, but certain qualifications must be attached. This has been attempted by subjecting such a sealed can to a hot oil bath of 275° F. to 400° F. The generation of steam is so great that it blows up the can. Even at lower searing temperatures the heat may bulge the sealed can and ruin it for commercial use. Therefore, in such cases, the can must be of such strength in its body and its seams that it will resist the pressure, and it must be confined by some lattice or grill work to maintain the shape of the can, so that the meat contents will be close to the searing walls of the can. In this connection it was found that the usual commercial cans may be treated to such a bath at 250° F. to 400° F. without mechanical reinforcement, to produce a can of normal condition, if the vent hole is open to exhaust the generated steam and entrained air.

It was also found that on cooling of cans sealed while filled with steam, a better collapse of the can walls against the contents is effected, whereby less void space in the can results, wherein to collect purged liquids. Thereby better heat conductance for uniform cooking is also effected.

Where a hot liquid bath is used it is preferably of oil, and this is advantageous. The oil leaves a thin oil film on the finished can which protects it while in storage from corrosive or rusting action which is sometimes observed on tinned-iron cans. Other liquids may be used, such as glycerine for lower temperatures. The oil may be a glyceride of fatty acid, such as cotton seed oil, corn oil, cocoanut oil or hydrogenated vegetable oils, or a hydrocarbon oil, and such are preferred for the higher bath temperature.

The preferred operating bath temperature for searing is 350° F. with a variation of 5° F. either side of this permitted in the control, such as may be effected by thermostatic means. A higher temperature of about 400° F. will scorch the meat, and where this is desired it has been used, as for example in producing the "baked ham" flavor. The time of immersion effects the depth of searing or cooking and may be varied as desired. The lower the bath temperature, the longer will be the minimum time for effecting the blow-out of air.

The minimum temperature must be a steam-generating temperature, and well above 212° F. because of the dissolved electrolyte in the juices of the meat both natural and added. It must be more than the actual boiling point of the liquid in the meat, in order to overcome reduction in temperature by transfer of heat from the bath, through the can wall, and into the meat. For effective generation of steam to blow out the air with limitation of cooking to the surface layers, a minimum bath temperature of 250° F. is recommended. As this goes higher to about 400° F., the degree and character of the searing varies.

In practice the invention is adapted for a production line, by use of an elongated tank for the hot oil in which the cans are carried from one end to the other by mechanical means. Preferably, the cans are carried slowly down and along the tank at the entry end, and slowly up and along the tank at the exit end.

Fig. 1 show a vertical cross-section of a suitable tank.

Fig. 2 shows a plan view of the tank in Fig. 1.

It is of course to be understood that the apparatus for the process invention is not limited to the form herein described by way of illustrating how the invention may be carried out.

In Fig. 1, a vat is shown with a central portion of uniform depth, and with inclined ends. The central portion is about 8 feet long, and the inclined ends about 3 feet long. Three conveyors are shown, which travel at the same speed.

The position or slant of the final conveyor on which the cans rise from the full immersion, may be varied to control the time of rise so that the steam jet is about to subside at the soldering station at the end of the tank. Various factors effecting such condition at the vent hole upon arrival at the soldering station are: size of can, temperature of bath, speed of motion along the tank, time of rise from the tank, temperature of air over the tank adjacent the emerged part of the can, and proximity of other cans to a particular can. All these are a matter of adjustment or control in operating the apparatus, to the preferred end that the can is not drawing in air at the vent-hole before it arrives at the soldering station.

The apparatus is supported by a frame-work 10 making the device a movable unit. There is a tank 11 which may vary in width. Preferably it has a width adapted to receive one or two parallel lines of cans, so that one or two operators may stand at the soldering station. A width may be chosen which carries one line of large cans, such as for hams, and two lines of smaller cans, as for luncheon meats.

Tank 11 has a horizontal floor 12, and inclined end floors 13 and 14. An open-top welded sheet iron tank is suitable. Two burners for gas or oil are illustrated at 15, but it is to be understood that electrical heating units may be immersed in the oil. Burner control valves are shown at 16.

A motor 18 and speed control device 20, are shown at the exit end, connected by a drive belt or chain 21 to a drive shaft 22 at the top end of the tank. Two sprocket wheels 23 and 24 are fixed on shaft 22, to drive endless chain conveyors 25 and 26 which have their other loops in sprocket wheels 27 and 28 fast on free shaft 30 at the bottom of the tank. The upper stretches rest on supports such as shown at 31 (Fig. 1) to hold the chain flat when weighted with cans as shown at 32 and 33.

Shaft 30 has four other sprocket wheels fast to it, which are in pairs 34 and 35, to carry four endless chain conveyors arranged in pairs, the chains being designated 36 to 39. These chains run in channels, the bottom of which is shown at 40 in Fig. 1, supported by cross-braces 41 in the tank. The chain top projects above the top of the channel to receive the cans, as shown at 42, 43 and 44. The channels prevent lateral and vertical play of the conveyor chains.

The conveyor structure at the entry end is a substantial duplicate of that for the exit end, there being a common shaft 45 at the bottom of the tank with sprockets for the chains 36 to 39, and for a pair of entry chains 46 and 47, and an end shaft 48 corresponding to drive shaft 22.

Over or inside the tank is a suitable guiding device secured to the tank, which is variable according to the cans employed, to keep them in line on the conveyors. This is illustrated generally by the rods designated 50, secured by devices designated 51.

Oil is shown in the tank at 53, at a depth which effects lubrication of the chain stretches on the supports or channels therefor. To conserve heat and avoid fumes, a hood 55 is placed over the tank, with open ends over the ends of the tank into which air is drawn, to be removed by the vent pipes 56 and 57, which join a common exhaust duct 58 (Fig. 2).

The exit end of the hood at the top is open as indicated at 59, to provide the soldering station. A soldering iron 60 is shown, which is used to melt a spot of solder. Cans 33 and 32, emerging from the tank are shown with columns of exhausting steam 61 and 62 diminishing from can 33 to can 32. It is noted that the escaping steam effects a cleansing of the vent hole, facilitating the soldering act.

In use of the device described, cans of hams are on the conveyors from 7 to 10 minutes, when the temperature of the oil is 350° F.

The cans leaving the steam may be taken directly to the cookers. The cooking may be done by any process, in which case the searing limits the purging. However, it is preferred to cook the cans by controlled processes which also limit purging such as those of the Komarik Patents No. 2,224,399, No. 2,305,479 and 2,305,480.

As an example of cooking a raw meat in a sealed can produced by the present invention, with or without the searing or the scorching, the following procedure is given.

The sealed can as it emerges from the process will have a very high external temperature, but the meat internally may be only a few degrees higher in temperature than when it entered the machine. In the case of a ham this is about 2° F. The can is exposed to a temperature in the range of 120° to 150° F. and not over 150° F. during the major part of the exposure period, until the remote and coldest part of the contents attains a temperature in the range from 125° to 130° F. Then it is subjected to a chill temperature of about 40° F., as for over night, until the warmest part is not over 65° F. Then the can is again heated to effect a cooking by exposure to temperature not over 180° F. during the major portion of the exposure period, such for example as a temperature decreasing in the range from 175° to 165° F., until the coolest part of the can attains a temperature of at least 160° F., and not over 170° F. It is to be understood that these two exposure temperatures may for a short time be above the said 150° F. or the said 180° F. temporarily, as for example, by using initially a hotter water bath, such as at 212° F. to be cooled by immersion of the cold cans, or for some other reason, accident or expedient. In this procedure the initial heating stage permits latent organic life to become activated, particularly thermophilic bacteria which may have escaped the sterilizing action of the steam. Then the cooling process allows a ripening and flavoring action to run, and the cooking kills the activated organisms.

Thus, in the preferred operation as for hams, the whole process employs a sterilization by steam in the can on surfaces most likely to be infected, and then there is activation of microorganisms, production of flavor, and cooking while killing activated organisms.

While the foregoing is the preferred use and practice of the invention, it is not to be considered as limited to the use of raw meat. Another common practice is to cook meat, especially hams in ham containers, whereby the purged juices may be separated from the shrunken ham, and then the ham is vacuum sealed in a can. The ham containers have the shape of the can which is to receive the ham, and have also a flat pressure platen on top of the ham to force it down into the container and to mold it to fit the can. In this practice, and with other meats or meat products cooked prior to sealing them in a can, the present invention may be employed to drive out air and create a vacuum on sealing, or at the same time to sear the meat, as for example to secure a "baked ham" taste to a canned ham, while in both instances generating a sterilizing steam inside the can.

The following example illustrates such use of the present invention in connection with incompletely cooked hams, to be completely cooked in the sealed can. The cooking process here illustrated is one producing a canned ham which may be kept without refrigeration, as described in said Komarik Patent No. 2,305,480.

A raw boned ham is placed in a ham container as above described, and the container is immersed in a water bath having a temperature in the range from 120° to 150° F. and not over 150° F. during the major portion of the exposure period, as for example increasing from 120° to 150° F., until the coldest part of the ham attains a temperature in the range from 125° to 130° F. Then the ham, in the container, or out of the container, or closed in a can with its vent hole open, is placed in a chill room, for example for over night at about 40° F., until the warmest part of the ham is at a temperature of not over 65° F. Then the can is subjected to a temperature, as in an oil bath, in the range from 250° to 400° F., in accordance with the present invention, and preferably in the range from 345° to 400° F., to effect searing or scorching of the ham surface. Thus, sterilizing steam is generated to kill organisms as described, especially any infection received in transferring the ham from the ham container to the can. The steam blows out air entrapped in the can and also some excess moisture. Then the vent-hole is sealed. At this point, only the surface of the contents has been highly heated in the treatment to generate steam, and the interior is still incompletely cooked. The sealed can is then subjected to an exposure temperature in the range from 180° to 165° F. and not over 180° F. during the major portion of the exposure period, as for example one decreasing from 175° to 165° F., until the coldest part of the contents attains a temperature of at least 160° F. and not over 170° F. It is to be understood that these two exposure temperatures may for a short time be above the said 150° F. or the said 180° F. temporarily, as for example, by using initially a hotter water bath, such as 212° F. to be cooled by immersion of the cold cans, or for some other reason, accident or expedient.

A modification of the above procedure is to can the ham immediately as taken from the ham container after the immersion cooking, and to subject the can to a steam-generating heat, whereby to permit sealing the can before placing it in the chill room.

The heating of the ham in the ham container need not be effected by immersion of the whole in water. Only the body of the container may be immersed, whereby at the end of the process, the purged juices may be separated from the shrunken ham.

In the above general or modified example, the searing to resist purging is not a major objective, because the heating of the ham in the can releases the purged juices from the meat, and when the meat is canned it is already shrunken as a result of such purging. The major aims of the present invention in such example are to sterilize and to seal, with a minor aim to sear or scorch the surface of the ham for taste or appearance or both. The particular cooking process is of course designed to improve the flavor by a ripening action between the two major heating treatments, and to produce a ham which has superior keeping qualities.

Although the above described example is referred to a ham, it is to be appreciated that the same principles and controls may be used for corned beef, tongue, and other whole meats, luncheon meats, compounded meats and loaves and the like.

The invention may be carried out in numerous ways falling within the scope of the appended claims.

We claim:

1. The process of canning meat and meat-base products which comprises closing meat material in a can with the provision of a vent hole in the can, subjecting the can to a temperature in the range from 250° to 400° F. to generate steam in the can whereby to sterilize within and to blow air in the can and said steam and moisture through the vent hole, the time of such heating being insufficient to heat the major portion of the contents to a cooking temperature, cooling the can, and sealing the vent hole before the steam in the can has condensed to create any substantial vacuum in the can at the vent hole.

2. The process of canning meat and meat-base products which comprises closing meat material in a can with the provision of a vent hole in the can, subjecting the can to a temperature in the range from 250° to 400° F. to generate steam in the can whereby to sterilize within and to blow air in the can and said steam and moisture through the vent hole, the time of such heating being insufficient to heat the major portion of the contents to a cooking temperature, cooling the can, and sealing the vent hole while a slight steam pressure exists in the can at the vent hole.

3. The process of canning meat and meat-base products which comprises closing raw to incompletely cooked meat material in a can with the provision of a vent hole in the can, subjecting the can to a temperature in the range from about 345° to 400° F. to generate steam in the can and to sear the surface of the contents of the can, whereby to sterilize within and to blow air in the can and said steam and moisture through the vent hole, the time of heating being insufficient to cook the major portion of the contents, cooling the can, sealing the vent hole before the steam has condensed to create any substantial vacuum in the can at the vent hole, and cooking the sealed can, the searing of the surface of the contents serving to minimize purging in the cooking process.

4. The process of canning meat and meat-base products which comprises closing raw to incompletely cooked meat material in a can with the provision of a vent hole in the can, subjecting the can to a temperature in the range from about 345° to 400° F. to generate steam in the can and to sear the surface of the contents of the can, whereby to sterilize within and to blow air in the can and said steam and moisture through the vent hole, the time of heating being insufficient to cook the major portion of the contents, cooling the can, sealing the vent hole while a slight steam pressure exists in the can at the vent hole, and cooking the sealed can, the searing of the surface of the contents serving to minimize purging in the cooking process.

5. In the process of producing cooked canned meat, the step of subjecting the closed can containing uncooked meat to a temperature in the range from 345° to 400° F. whereby to generate sterilizing steam in the can and to sear the surface of the contents of the can with avoidance of cooking the major contents, whereby the searing minimizes purging of the contents in subsequent cooking of the sealed can.

6. In the process of producing cooked canned meat, the step of subjecting the unsealed but closed can containing uncooked meat to a temperature in the range from 345° to 400° F. whereby to generate sterilizing steam in the can and to sear the surface of the contents of the can with avoidance of cooking the major contents, whereby the searing minimizes purging of the contents in subsequent cooking of the sealed can.

7. The process of canning meat and meat-base products which comprises closing meat material in a can with the provision of a vent hole in the can, immersing the can except for the portion having the vent-hole in a liquid bath at a temperature in the range from 250° to 400° F. to generate sterilizing steam in the can whereby to blow air and said steam and moisture through the vent hole, the time of immersion being insufficient to heat the major contents of the can to a cooking temperature, cooling the can, and sealing the vent hole before the steam in the can has condensed to create any substantial vacuum in the can.

8. The process of canning meat and meat-base products which comprises closing meat material in a can with the provision of a vent hole in the can, immersing the can except for the portion having the vent-hole in a liquid bath at a temperature in the range from 250° to 400° F. to generate sterilizing steam in the can whereby to blow air and said steam and moisture through the vent hole, the time of immersion being insufficient to heat the major contents of the can to a cooking temperature, cooling the can, and sealing the vent hole while a slight steam pressure exists in the can at the vent hole.

9. The process of canning meat and meat-base products which comprises closing raw to incompletely cooked meat material in a can with the provision of a vent hole in the can, immersing the can except for the portion having the vent-hole in a liquid bath at a temperature in the range from about 345° to 400° F. to generate sterilizing steam in the can whereby to blow air and said steam and moisture through the vent hole and to sear the surface of the contents of the can, the time of immersion being insufficient to cook the major contents of the can, sealing the vent hole before the steam has condensed to create any substantial vacuum in the can at the vent hole, and cooking the sealed can, the searing of the surface of the contents serving to minimize purging in the cooking process.

10. The process of canning meat and meat-base products which comprises closing raw to incompletely cooked meat material in a can with the provision of a vent hole in the can, immersing the can except for the portion having the vent-hole in a liquid bath at a temperature in the range from about 345° to 400° F. to generate sterilizing steam in the can whereby to blow air and said steam and moisture through the vent hole and to sear the surface of the contents of the can, the time of immersion being insufficient to cook the major contents of the can, sealing the vent hole while a slight steam pressure exists in the can at the vent hole, and cooking the sealed can, the searing of the surface of the contents serving to minimize purging in the cooking process.

11. In the process of producing cooked canned meat, the step of subjecting the closed can containing raw to incompletely cooked meat to immersion in a liquid bath at a temperature in the range from 345° to 400° F. to generate sterilizing steam in the can and to sear the surface of the contents of the can with the avoidance of cooking the major contents, whereby the searing minimizes purging of the contents in subsequent cooking of the sealed can.

12. The process of sealing cans containing meat to effect a vacuum seal in the finished product which comprises closing meat material in a can with the provision of a vent-hole in the can, subjecting the can to a temperature in the range from 250° to 400° F. to generate sterilizing steam in the can and to blow air in the can and said steam and moisture through the vent hole, cooling the can, and sealing the vent hole before steam in the can has condensed to create any substantial vacuum in the can at the vent hole.

13. The process of sealing cans containing meat to effect a vacuum seal in the finished product which comprises closing meat material in a can with the provision of a vent hole in the can, subjecting the can to a temperature in the range from 250° to 400° F. to generate sterilizing steam in the can and to blow air in the can and said steam and moisture through the vent hole, cooling the can, and sealing the vent hole while a slight steam pressure exists in the can at the vent hole.

14. In the process of producing cooked canned meat, the step of subjecting the unsealed but vented closed can containing raw to incompletely cooked meat to immersion in a liquid bath at a temperature in the range from 345° to 400° F. to generate sterilizing steam in the can and to sear the surface of the contents of the can with the avoidance of cooking the major contents, whereby the searing minimizes purging of the contents in subsequent cooking of the sealed can, the immersion being limited to expose the vent hole above the bath.

15. The process of treating meat enclosed in a can which comprises subjecting the can to a temperature in the range from 250° to 400° F. to generate sterilizing steam within the can.

CARROLL L. GRIFFITH.
STEPHAN L. KOMARIK.